US007234085B2

(12) United States Patent
Ahrens, Jr. et al.

(10) Patent No.: US 7,234,085 B2
(45) Date of Patent: Jun. 19, 2007

(54) METHOD, SYSTEM, AND PRODUCT FOR HIERARCHICAL ENCODING OF FIELD REPLACEABLE UNIT SERVICE INDICATORS

(75) Inventors: George Henry Ahrens, Jr., Pflugerville, TX (US); Gerald J. Fahr, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 10/755,876

(22) Filed: Jan. 13, 2004

(65) Prior Publication Data

US 2005/0160314 A1 Jul. 21, 2005

(51) Int. Cl.
*G06F 11/00* (2006.01)
(52) U.S. Cl. ....................................... 714/57
(58) Field of Classification Search .................. 714/57
See application file for complete search history.

(56) References Cited

U.S. PATENT DOCUMENTS

| | | | |
|---|---|---|---|
| 3,928,830 A * | 12/1975 | Bellamy et al. | ............... 714/57 |
| 5,327,435 A | 7/1994 | Warchol | ..................... 371/16.1 |
| 5,519,832 A | 5/1996 | Warchol | ................. 395/183.22 |
| 5,818,343 A * | 10/1998 | Sobel et al. | ........... 340/815.65 |
| 6,157,559 A | 12/2000 | Yoo | ............................. 365/52 |
| 6,519,552 B1 * | 2/2003 | Sampath et al. | ............. 702/183 |
| 6,625,742 B1 | 9/2003 | Owhadi et al. | .............. 713/340 |
| 6,850,417 B2 * | 2/2005 | Cooper et al. | .............. 361/752 |
| 6,931,519 B1 * | 8/2005 | Keller | ........................... 713/1 |
| 2002/0084908 A1 * | 7/2002 | Los et al. | ............. 340/815.45 |
| 2002/0099873 A1 * | 7/2002 | Hileman et al. | ............... 710/1 |
| 2002/0138782 A1 * | 9/2002 | Durrant et al. | ................ 714/2 |
| 2003/0217153 A1 * | 11/2003 | Rao et al. | ................... 709/226 |
| 2004/0205398 A1 * | 10/2004 | Osborn et al. | ................ 714/25 |

* cited by examiner

*Primary Examiner*—Robert Beausoliel
*Assistant Examiner*—Amine Riad
(74) *Attorney, Agent, or Firm*—Duke W. Yee; Diana R. Gerhardt; Lisa L. B. Yociss (57) ABSTRACT

A method, system, and computer program product are disclosed for hierarchically encoding indicators used to identify an instance of a device. Multiple nodes are included. Each node includes an implemented instance of a device. Multiple hierarchical indicators and multiple identity indicators are provided. Each one of the hierarchical indicators is associated with a different one of the nodes. Each one of the identity indicators is associated with a different one of the devices. One of the hierarchical indicators and one of the identity indicators are used for identifying an instance of one of the devices.

27 Claims, 5 Drawing Sheets

METHOD, SYSTEM, AND PRODUCT FOR HIERARCHICAL ENCODING OF FIELD REPLACEABLE UNIT SERVICE INDICATORS

This subject matter of the present application is related to commonly assigned and co-pending U.S. patent application Ser. No. 10/755,880, entitled METHOD, SYSTEM, AND PRODUCT FOR INDICATING POWER STATUS OF FIELD REPLACEABLE UNITS, filed on the same date herewith, assigned to the same assignee hereof, and hereby incorporated by reference.

BACKGROUND OF THE INVENTION

1. Technical Field

The present invention relates generally to an improved data processing system, and in particular to a method, system, and product for hierarchically encoding service indicators that are used to indicate when service is needed for field replaceable units (FRUs).

2. Description of Related Art

Service indicators, such as LEDs, are typically used to help service technicians locate the correct component to be repaired on a computer system. On many small and mid-range computers, each field replaceable unit (FRU) has an unlabeled LED which represents the FRU that needs to be repaired. The LED is physically mounted on the FRU itself or the second level package that includes the FRU. Therefore, the LED does not need to be labeled since it is physically located on the FRU, or the FRU's outer package, that needs service. In these systems, there is a one-to-one correspondence between each FRU and the indicator that represents the FRU. Thus, in these systems, each FRU is associated with and represented by its own LED.

On high end systems, because of the density of the package and number of FRUs involved, a light strip is sometimes used to mount the LEDs in a visible location. Thus, instead of being mounted directly on the FRU or the second level package that includes the FRU, each LED is mounted on the light strip. The light strip includes an LED for each FRU in the system. In this example, there remains a one-to-one correspondence between FRUs and LEDs. Each individual FRU is associated with and represented by its own LED.

In some high end systems, all of these LEDs could total in the hundreds. This creates many problems. The light strip must be very large and located somewhere close to the central processing complex that includes the processing nodes, but not in the way of service technicians or airflow for cooling. There may be problems with lighting this large number of LEDs in standby mode of operation. And, it may be hard for the service technician to distinguish which LED is associated with which FRU because of the large number of LEDs. This then defeats the purpose of having LEDs.

Therefore, a need exists for a method, system, and product for hierarchically encoding service indicators that are used to indicate when service is needed for field replaceable units (FRUs).

SUMMARY OF THE INVENTION

A method, system, and computer program product are disclosed for hierarchically encoding indicators used to identify an instance of a device. Multiple nodes are included. Each node includes an implemented instance of a device. Multiple hierarchical indicators and multiple identity indicators are provided. Each one of the hierarchical indicators is associated with a different one of the nodes. Each one of the identity indicators is associated with a different one of the devices. One of the hierarchical indicators and one of the identity indicators are used for identifying an instance of one of the devices.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, system, and computer program product for hierarchically encoding indicators. The indicators may be used to identify particular instances of devices, or may be used to identify the location of a device. An identity indicator is associated with each first level device. A hierarchical indicator is associated with each second level node or location which includes a device. If additional levels of hierarchy exist, additional levels of hierarchical indicators will also be provided and associated with these levels. Thus, there is a hierarchical indicator level for each level of node or location.

The hierarchical indicators and identity indicators are utilized simultaneously to indicate a particular instance of a device. The identity indicator that is associated with the particular device and the hierarchical indicator that is asso ciated with the location of the particular instance are both simultaneously activated in order to identify the particular instance. These indicators are activated while the remaining indicators remain deactivated.

A first type of indicator is described herein as an identity indicator. A second type of indicator is described herein as a power indicator. The power indicators include a first level indicator for indicating power at a node level and a second level indicator for indicating power at a FRU level. A hierarchical indicator is also described that may be used in conjunction with the identity indicators for identifying particular instances of actual FRUs.

Figure 1:
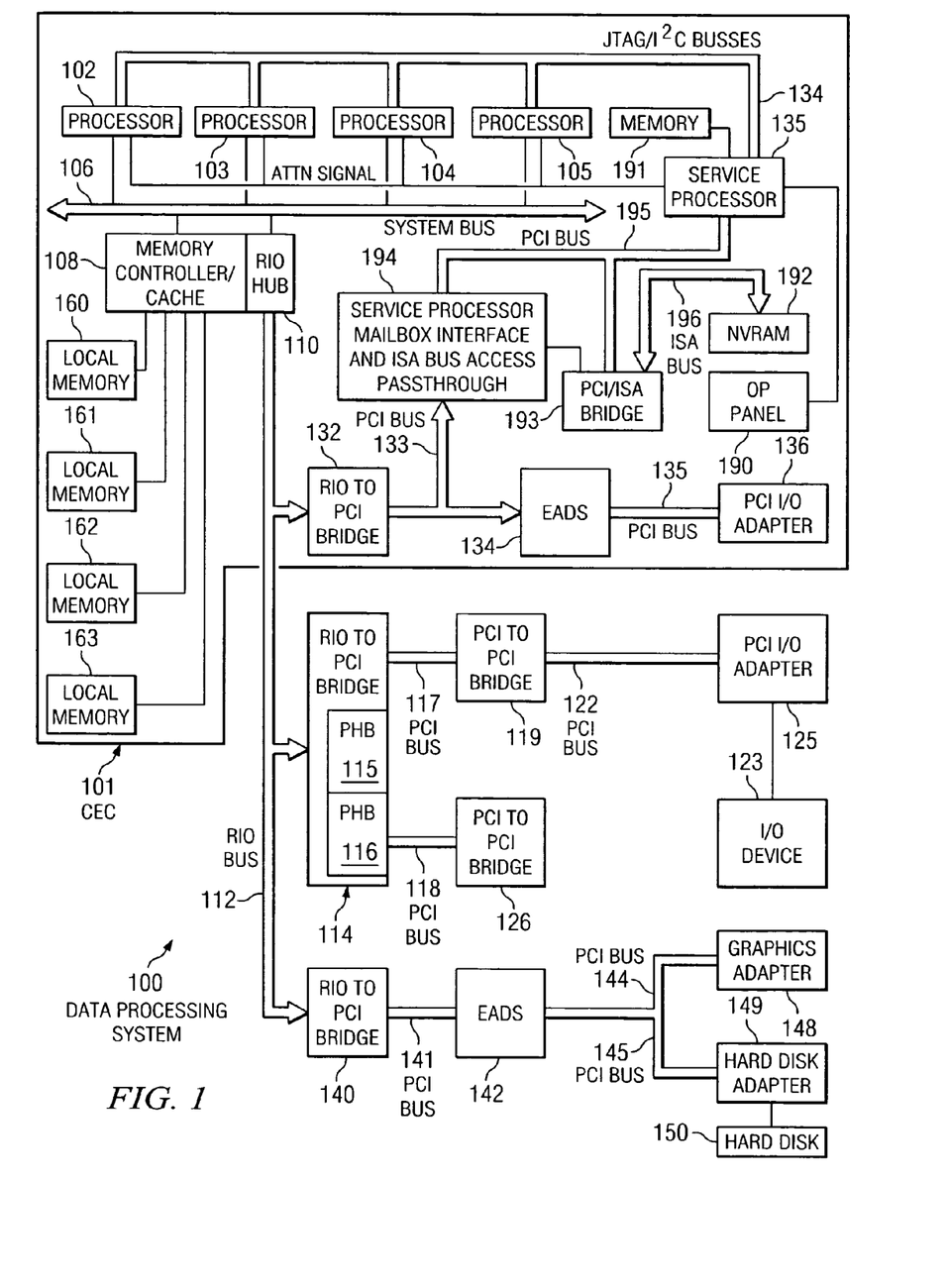
FIG. 1 is a block diagram of a data processing system in which the present invention may be implemented in accordance with the present invention.

FIG. 1 depicts a block diagram of a data processing system in which the present invention may be implemented in accordance with the present invention. Data processing system 100 may be a symmetric multiprocessor (SMP) system including a plurality of processors 102, 103, 104, and 105 connected to a bus 106. For example, data processing system 100 may be an IBM eServer pSeries, a product of International Business Machines Corporation in Armonk, N.Y. Data processing system 100 includes a central electronic complex (CEC) 101 which may include logically partitioned hardware. CEC 101 includes a plurality of processors 102, 103, 104, and 105 connected to system bus 106. Alternatively, a single processor system may be employed. Also connected to system bus 106 is memory controller/cache 108, which provides an interface to a plurality of local memories 160-163. RIO Hub 110 is connected to system bus 106 and provides an interface to RIO bus 112. Memory controller/cache 108 and RIO Hub 110 may be integrated as depicted.

Data processing system 100 may be a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 may be logically partitioned such that different PCI slots, to which PCI I/O adapters may be coupled may each be assigned to different logical partitions. In this case, graphics adapter 148 provides a connection for a display device (not shown), while hard disk adapter 149 provides a connection to control hard disk 150.

Remote Input/Output (RIO) to PCI bridge 114 is connected to RIO bus 112 and provides an interface to PCI bus 117 and PCI bus 118. RIO to PCI bridge 114 includes one or more PCI host bridges (PHB), such as PHB 115 and PHB 116. Each PHB is coupled to a PCI to PCI bridge through a PCI bus. For example, PHB 115 is coupled to PCI to PCI bridge 119 through PCI bus 117. PHB 116 is coupled to PCI to PCI bridge 126 through PCI bus 118.

An I/O device may be coupled to data processing system 100 utilizing an I/O adapter. For example, as depicted, I/O device 123 is coupled to I/O adapter 125.

A memory mapped graphics adapter 148 may be connected to RIO bus 112 through PCI bus 144, EADS 142, PCI bus 141, and RIO to PCI bridge 140. A hard disk 150 may be coupled to hard disk adapter 149 which is connected to PCI bus 145. In turn, this bus is connected to EADS 142, which is connected to RIO to PCI Bridge 140 by PCI bus 141.

An RIO to PCI bridge 132 provides an interface for a PCI bus 133 to connect to RIO bus 112. PCI I/O adapter 136 is connected to EADS 134 by PCI bus 135. EADS 132 is connected to PCI bus 133. This PCI bus also connects RIO to PCI bridge 132 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 102–105 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 102, 103, 104, and 105 are connected together to an interrupt input signal of the service processor. The service processor 135 has its own local memory 191, and has access to the hardware OP-panel 190.

Data processing system 100 may be implemented using various commercially available computer systems. For example, data processing system 100 may be implemented using IBM eServer pSeries system available from International Business Machines Corporation. Such a system may support logical partitioning using an AIX, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
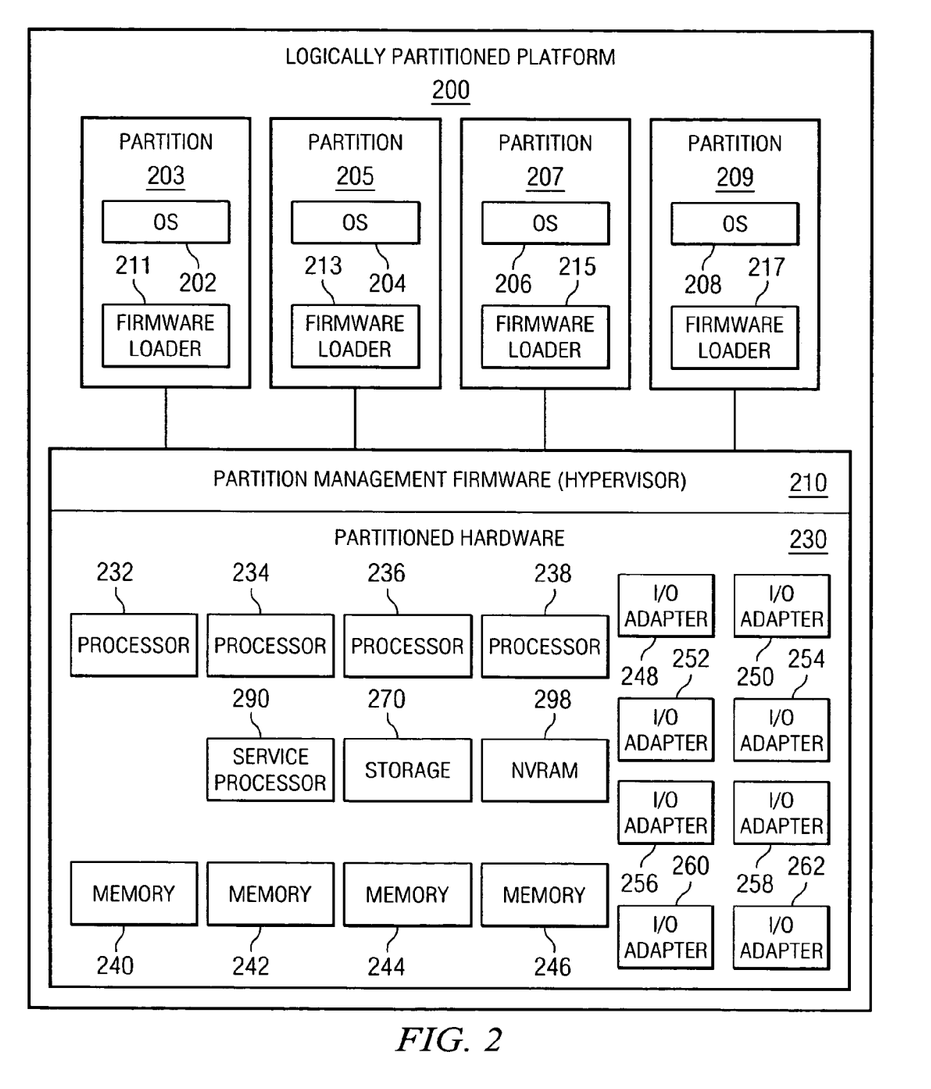
FIG. 2 is a block diagram of an exemplary logically partitioned platform in which the present invention may be implemented in accordance with the present invention.

With reference now to FIG. 2, a block diagram of an exemplary logically partitioned platform is depicted in which the present invention may be implemented. The hardware in logically partitioned platform 200 may be implemented as, for example, data processing system 100 in FIG. 1. Logically partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using AIX which are designed to interface with a hypervisor. Operating systems 202, 204, 206, and 208 are located in partitions 203, 205, 207, and 209. Additionally, these partitions also include firmware loaders and partition support 211, 213, 215, and 217. When partitions 203, 205, 207, and 209 are instantiated, a copy of the open firmware is loaded into each partition by the hypervisor's partition, manager. The processors associated or assigned to the partitions are then dispatched to the partitions' memory to execute the partition firmware.

Partitioned hardware 230 includes a plurality of processors 232–238, a plurality of system memory units 240–246, a plurality of input/output (I/O) adapters 248–262, and a storage unit 270. Partitioned hardware 230 also includes service processor 290, which may be used to provide various services, such as processing of errors in the partitions. Each of the processors 232–238, memory units 240–246, NVRAM storage 298, and I/O adapters 248–262 may be assigned to one of multiple partitions within logically partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logically partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 202, 204, 206, and 208 by virtualizing all the hardware resources of logically partitioned platform 200.

Figure 3:
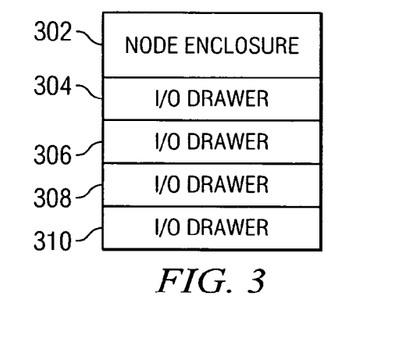
FIG. 3 depicts a block diagram of a computer system including a node enclosure and I/O drawers in accordance with the present invention.

FIG. 3 depicts a block diagram of a computer system 300 including a node enclosure 302 and I/O drawers 304-310 in accordance with the present invention. Computer system 300 may communicate with other systems via one or more of the I/O drawers 304-310.

Figure 4:
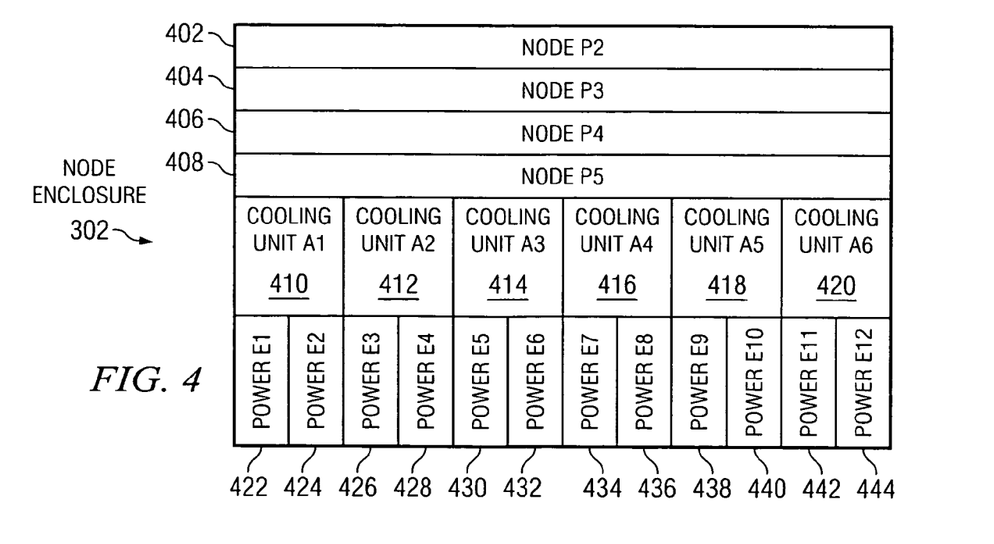
FIG. 4 illustrates a more detailed block diagram of a node enclosure in accordance with the present invention.

FIG. 4 illustrates a more detailed block diagram of node enclosure 302 in accordance with the present invention. Node enclosure 302 includes multiple nodes 402–408, multiple cooling units 410–420, and multiple power units 422–444. Cooling units 410–420 and power units 422–444 are used to cool and power nodes 402–408.

Figure 5:
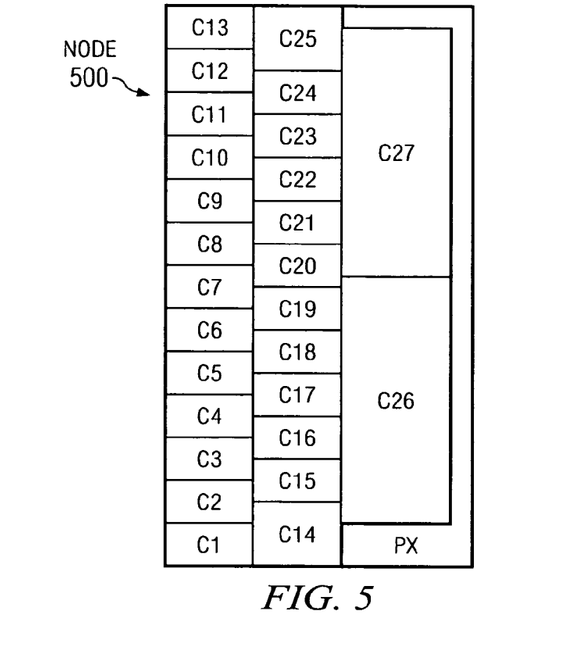
FIG. 5 depicts a more detailed block diagram of a node in accordance with the present invention.

FIG. 5 depicts a more detailed block diagram of a node 500 in accordance with the present invention. Node 500 may be used to implement any of nodes 402–408. Node 500 includes a planar card Px on which are connected processors C26 and C27, memory DIMMs C14–C25, various I/O cards and adapters C5–C13, and redundant clocks and service processors C1–C4. Each Px and C1–C27 device in each node is an individual field replaceable unit (FRU). Therefore, each one of the Px and C1–C27 FRUS needs to be associated with an identity indicator that indicates when the actual FRU needs to be serviced, such as by being replaced or repaired.

The set of Px and C1–C27 FRUs is replicated throughout nodes 402–408. There is a separate set of Px and C1–C27 FRUs in each node 402–408.

Figure 6:
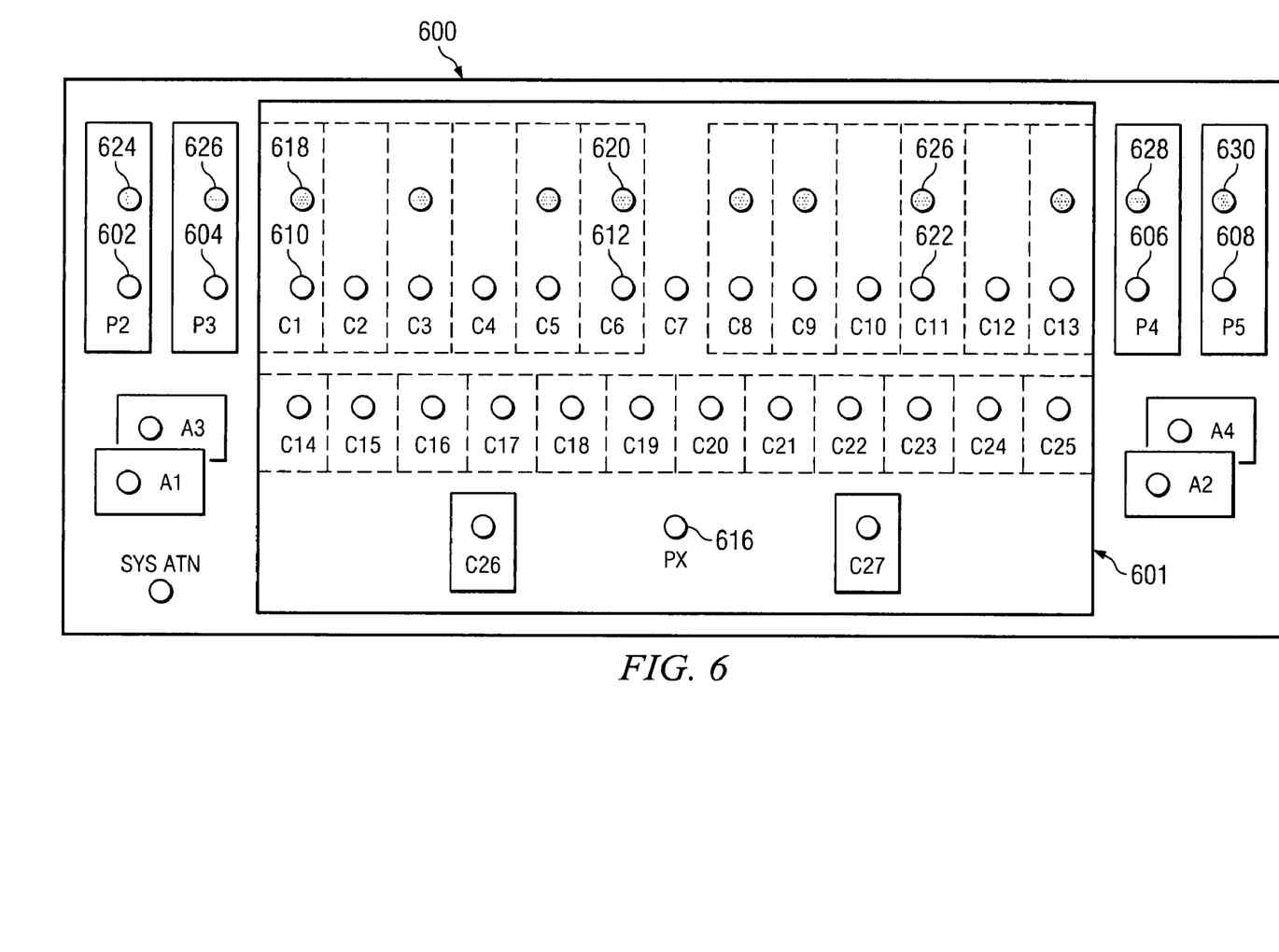
FIG. 6 illustrates a block diagram of a front panel indicator panel for indicating when FRUs need to be serviced in accordance with the present invention.
Figure 7:
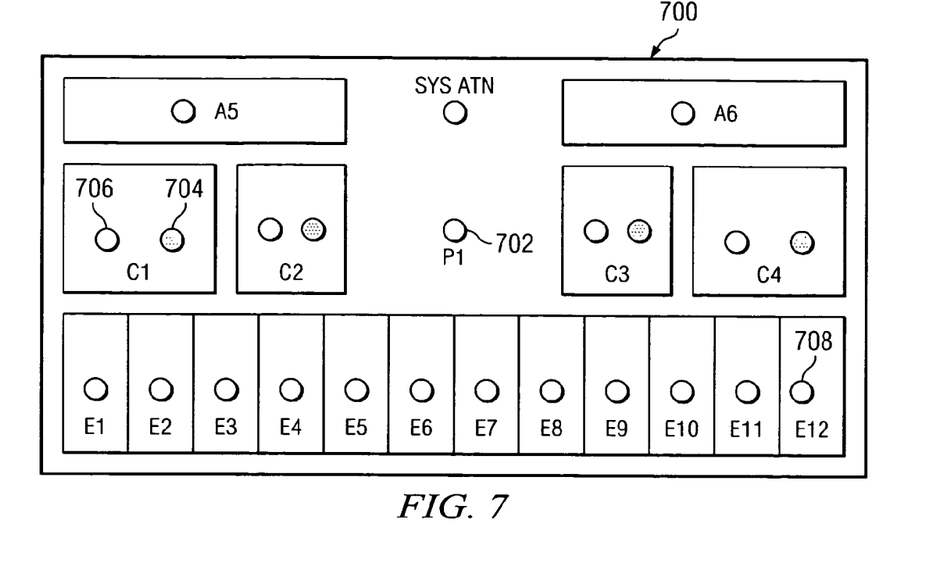
FIG. 7 illustrates a block diagram of a back panel indicator panel for indicating when FRUs need to be serviced in accordance with the present invention.

FIG. 6 illustrates a block diagram of a front panel indicator panel 600 for indicating when FRUs need to be serviced in accordance with the present invention. FIG. 7 illustrates a block diagram of a back panel indicator panel 700 for indicating when FRUs need to be serviced in accordance with the present invention. The identity indicators included in panels 600 and 700 are labeled according to the FRU they are associated with in order to assist a service technician in quickly identifying and locating an actual FRU that requires service.

Indicator panels 600 and 700 include an identity indicator, such as an amber LED, associated with the FRUs in a node enclosure. Some amber identity indicators represent only one actual FRU, while other amber identity indicators represent several FRUs. There are some FRUs, such as the clock, service processor, and power supplies, where there are multiple instances of the same FRU where each instance of the FRU is associated with its own amber indicator. Thus, there is a one-to-one association between indicators and FRUs for some FRUs, while there is a one-to-many association between other indicators and the FRUs that they represent.

There are several identical sets of Px and C1–C27 FRUs in node enclosure 302. There is a separate set of Px and C1–C27 FRUs in each node 402–408. The present invention provides for only one amber identity indicator for each FRU in the set. Thus, there are 28 indicators, one for each of Px and C1–C27. These 28 indicators are used to indicate a Px or C1–C27 FRU no matter what node includes the actual FRU. Therefore, these indicators indicate which FRU in a set requires service but does not indicate the actual FRU that needs service. For these indicators, there is a one-to-many relationship between an indicator and FRUs.

For example, if the amber indicator that is associated with and represents the C5 FRU is activated, a service technician will know that a C5 FRU needs to be replaced. The service technician does not know, just by looking at the single C5 FRU indicator, which actual C5 FRU needs to be replaced. The technician does not know which node includes the C5 FRU that needs to be replaced.

In order to identify an actual FRU that needs to be replaced, the present invention provides for hierarchical indicators in addition to the identity indicators. There is a hierarchical indicator for each level of hierarchy provided. In the present invention, there are two hierarchy levels. There is a set, or FRU, level having the 28 identity indicators, and a node level have four indicators. By looking to the combination of identity and hierarchy indicators, a technician may locate the actual FRU that needs service.

For example, the 28 identity indicators are provided as Px and C1–C27. In addition, hierarchy indicators 602, 604, 606, and 608 are provided. The hierarchy indicators 602, 604, 606, and 608 are used in conjunction with the 28 identity indicators in order to identify an actual FRU. One of the identity indicators will be activated to identify one of the FRUs of the set. And, in order to identify the actual FRU that needs service, one of the hierarchy indicators 602, 604, 606, and 608 will be activated simultaneously with the identity indicator while the remaining hierarchy and identity indicators remain deactivated. For example, if the C6 FRU in P4 node 406 needs service, amber identity indicator 612 and amber identity indicator 606 will both be activated simultaneously.

Some identity indicators represent just one actual FRU. For example, amber indicators A1–A6 (see FIGS. 6 and 7) are associated with and indicate whether cooling units 410–420 need service. Amber indicator A1 is associated with cooling unit 410. Amber indicator A2 is associated with cooling unit 412. Amber indicator A3 is associated with cooling unit 414. Amber indicator A4 is associated with cooling unit 416. Amber indicator A5 is associated with cooling unit 418. And, amber indicator A6 is associated with cooling unit 420.

As another example, there are twelve separate power units 422–444 depicted in node enclosure 302. There is a one-to-one correspondence between E1–E12 indicators and power units 422–444. Amber indicator E1 is associated with and indicates whether power unit 422 needs service. Amber indicator E2 is associated with and indicates whether power unit 424 needs service. Amber indicator E3 is associated with and indicates whether power unit 426 needs service. Amber indicator E4 is associated with and indicates whether power unit 428 needs service. Amber indicator E5 is associated with and indicates whether power unit 430 needs service. Amber indicator E6 is associated with and indicates whether power unit 432 needs service. Amber indicator E7 is associated with and indicates whether power unit 434 needs service. Amber indicator E8 is associated with and indicates whether power unit 436 needs service. Amber indicator E9 is associated with and indicates whether power unit 438 needs service. Amber indicator E10 is associated with and indicates whether power unit 440 needs service. Amber indicator E1 is associated with and indicates whether power unit 442 needs service. And, amber indicator E12 is associated with and indicates whether power unit 444 needs service.

Some identity indicators represent multiple FRUs. Some sets of FRUs are found in more than one node in node enclosure 302. Thus, a set of FRUs may be replicated in node enclosure 302 such that several nodes include one of these sets of FRUs. As described above, the present invention provides a set of amber indicators where each amber indicator in the set represents an FRU included in the set of FRUs. Each one of these amber indicators then represents a particular FRU but does not by itself indicate an actual FRU in a particular node. These amber indicators do not indicate by themselves which set includes an FRU represented by the indicator. Thus, when one of the amber indicators is activated, it indicates that an FRU needs service, but does not indicate which set of FRUs includes the FRU that needs service. In addition to the set of amber indicators, there are hierarchical indicators that indicate which set includes an actual FRU that needs service. Thus, for sets of FRUs that are replicated throughout the node enclosure, there is a one-to-many relationship between amber indicators and actual FRUs.

For example, each node includes a set of FRUs C1–C27. Instead of providing 112 different indicators which would be required for a system having 28 indicators repeated in four different nodes, the present invention provides for only 32 indicators. Thus the indicators in box 601 indicate the status of the FRUs in the set of FRUs found in each node. When one of these indicators is activated, it means that a FRU needs service in one of the nodes. In order to determine which node includes the actual FRU that needs service, a hierarchical amber indicator is included for each node. Thus, amber indicator P2 602 is associated with node 402. Amber indicator P3 604 is associated with node 404. Amber indicator P4 606 is associated with node 406. And, amber indicator P5 608 is associated with node 408.

An amber indicator is provided for set of FRUs C1–C27 and for the planar itself Px. For example, amber indicator C1 610 is provided and indicates whether the FRU C1 needs service on one of the nodes P2–P5 402–408. Amber indicator C6 612 is provided and indicates whether the FRU C6 needs service on one of the nodes P2–P5 402–408. And, amber indicator C1 622 is provided and indicates whether the FRU C11 needs service on one of the nodes P2–P5 402–408. Amber indicator Px 616 is provided and indicates whether one of the planars needs service.

When an FRU on one of the nodes needs service, the amber indicator that is associated with that FRU is activated. For example, if FRU C6 on node P4 406 needs service, amber indicator 612 is activated. According to the present invention, indicators 602–608 for nodes 402–408 are used to indicate which node 402–408 includes the particular FRU that needs service. In this example, amber indicator P4 606 will be activated. In this manner, indicator 612 indicates that a C6 FRU needs to be serviced, and indicator 606 is used to indicate that the actual C6 FRU that needs service is located on node 406.

The present invention also provides for a set of green power indicators that indicate whether an FRU is currently receiving power. Some of the FRUs may be replaced while the system is running. However, it is still important to know whether the FRU is currently receiving power prior to attempting to replace the FRU. For the FRUs that are of a type which permit replacement while the system is running, a green power indicator is also provided.

For example, the C1, C3, C5, C6, C8, C9, C11, and C13 FRUs are types of FRUs that can be replaced while the system is running. For example, green power indicator 618 indicates whether any of the C1 FRUs are currently receiving power in any of the nodes 402–408. Green power indicator 620 indicates whether any of the C6 FRUs are currently receiving power in any of the nodes 402–408. And, green power indicator 626 indicates whether any of the C11 FRUs are currently receiving power in any of the nodes 402–408.

The present invention provides for use of the green power indicators in two ways. The green power indicators of panels 600 and 700 may be lit to indicate whether any of the nodes 402–408 and FRUs are receiving power. Thus, a green power indicator of box 601 will be activated if the FRUs represented by that green power indicator in each node are currently receiving power. If none of the FRUs represented by that green power indicator are receiving power in any of the nodes, its green power indicator will be off. If at least one FRU but not all of the FRUs represented by the green power indicator are receiving power, the green power indicator will blink.

Green power indicators 624–630 are used to indicate whether power is present on any of the FRUs included in the node associated with the indicator. Power indicator 624 will be activated if there is a voltage present on any of the FRUs included in node P2 402. Power indicator 626 will be activated if there is a voltage present on any of the FRUs included in node P3 404. Power indicator 628 will be activated if there is a voltage present on any of the FRUs included in node P4 406. And, power indicator 630 will be activated if there is a voltage present on any of the FRUs included in node P5 408.

A second method for using the green power indicators is to select just one node to evaluate. Thus, in this case, the panels 600 and 700 are set by a command to indicate only one node as described below.

For example, a service technician may wish to see the power status for the FRUs of node P3 404 which may be replaced while the system is running. A command will be sent from a microcontroller that is executing the present invention to panels 600 and 700 causing the panels' green power indicators to indicate power status for node P3 404. In this case, a green power indicator of box 601 will be on if the FRU in node P3 that is represented by the green power indicator is receiving power and off if it is not.

Figure 8:
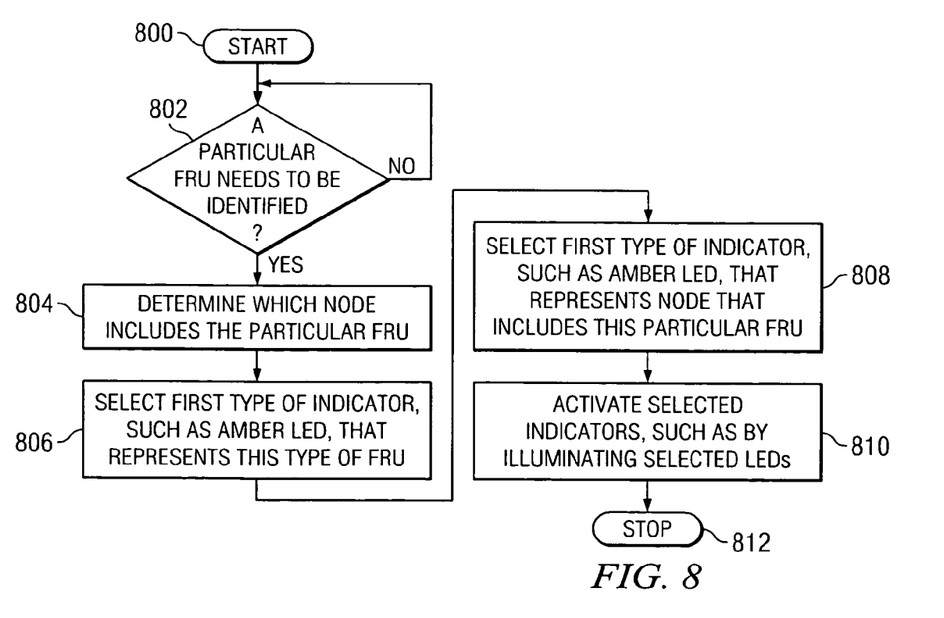
FIG. 8 depicts a high level flow chart that illustrates activating amber indicators to indicate that one or more particular FRUs need service in accordance with the present invention.

FIG. 8 depicts a high level flow chart that illustrates activating amber indicators to indicate that one or more particular FRUs need service in accordance with the present invention. The process starts as depicted by block 800 and thereafter passes to block 802 which illustrates a determination of whether any of the particular instances of FRUs of a set need to be identified. If none of the particular instances of FRUs need to be identified, the process passes back to block 802. If a particular instance of a FRU needs to be identified, the process passes to block 804 which depicts determining which node includes the particular instance of the FRU that needs to be identified. Next, block 806 illustrates selecting a first type of indicator, such as an amber identity LED, that represents this FRU instance.

The process then passes to block 808 which depicts selecting a first type of indicator, such as an amber LED, that represents the node that includes this particular FRU instance. This is the hierarchical indicator. Next, block 810 illustrates activating the selected first type of indicators, such as by illuminating the selected amber LEDs. The process then terminates as depicted by block 812.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable–type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for hierarchically encoding indicators that are used to identify one of a plurality of devices, said method comprising the steps of:
    providing a plurality of nodes, each one of said plurality of nodes including an identical set of a plurality of devices;
    associating each one of a plurality of hierarchical indicators with a different one of said plurality of nodes;
    associating each one of a plurality of identity indicators with a different one of said plurality of devices; and
    identifying one of said plurality of devices in one of said plurality of nodes using a combination of one of said plurality of hierarchical indicators and one of said plurality of identity indicators.

2. The method according to claim 1, further comprising:
    utilizing said one of said plurality of hierarchical indicators and said one of said plurality of identity indicators for identifying a physical location of said one of said plurality of devices.

3. The method according to claim 1, further comprising:
    said plurality of devices being a plurality of field replaceable units (FRUs).

4. The method according to claim 1, further comprising:
    determining that a second one of said plurality of devices needs to be identified;
    determining one of said plurality of nodes within which said second ine of said plurality of devices is located;
    identifying a second one of said plurality of hierarchical indicators that is associated with said determined one of said plurality of nodes;
    identifying a second one of said plurality of identity indicators that is associated with said second one of said plurality of devices; and
    utilizing said second one of said plurality of hierarchical indicators and said second one of said plurality of identity indicators to identify said second one of said plurality of devices.

5. The method according to claim 4, further comprising:
    said step of utilizing said second one of said plurality of hierarchical indicators and said second one of said plurality of identity indicators to identify said second one of said plurality of devices further including activating said second one of said plurality of hierarchical indicators and said second one of said plurality of identity indicators.

6. The method according to claim 5, further comprising:
    activating said second one of said plurality of hierarchical indicators and said second one of said plurality of identity indicators while all remaining ones of said plurality of hierarchical indicators and said plurality of identity indicators remain deactivated.

7. The method according to claim 5, further comprising:
    each one of said plurality of hierarchical indicators and each one of said plurality of identity indicators being an LED.

8. The method according to claim 4, further comprising:
    each one of said plurality of hierarchical indicators and each one of said plurality of identity indicators being an LED;
    identifying a first LED that is associated with said determined one of said plurality of nodes;
    identifying a second LED that is associated with said second one of said plurality of devices; and
    said step of utilizing said second one of said plurality of hierarchical indicators and said second one of said plurality of identity indicators to identify said second one of said plurality of devices further including turning said first and second LEDs on.

9. The method according to claim 8, further comprising:
    deactivating said second one of said plurality of hierarchical indicators and said second one of said plurality of identity indicators to identify said said second one of said plurality of devices further including turning said first and second LEDs off.

10. A data processing system for hierarchically encoding indicators that are used to identify one of a plurality of devices, said system comprising:
    a plurality of nodes, each one of said plurality of nodes including an identical set of a plurality of devices;
    each one of a plurality of hierarchical indicators being associated with a different one of said plurality of nodes;
    each one of a plurality of identity indicators being associated with a different one of said plurality of devices; and
    one of said plurality of devices veing identified in one of said plurality of nodes using a combination of one of said plurality of hierarchical indicators and one of said plurality of identity indicators.

11. The system according to claim 10, further comprising:
    said one of said plurality of hierarchical indicators and said one of said plurality of identity indicators being utilized for identifying a physical location of said one of said plurality of devices.

12. The system according to claim 10, further comprising:
    said plurality of devices being a plurality of field replaceable units (FRUs).

13. The system according to claim 10, further comprising:
    a second one of said plurality of devices that needs to be identified;
    said system including a CPU executing code for determining one of said plurality of nodes within which second one of said plurality of devices is located;
    said CPU executing code for identifying a second one of said plurality of hierarchical indicators that is associated with said determined one of said plurality of nodes;
    said CPU executing code for identifying a second one of said plurality of identity indicators that is associated with said second one of said plurality of devices; and
    said CPU executing code for utilizing said second one of said plurality of hierarchical indicators and said second one of said plurality of identity indicators to identify said second one of said plurality of devices.

14. The system according to claim 13, further comprising:
    said CPU executing code for activating said second one of said plurality of hierarchical indicators and said second one of said plurality of identity indicators.

15. The system according to claim 14, further comprising:
said CPU executing code for simultaneously activating said second one of said plurality of hierarchical indicators and said second one of said plurality of identity indicators while all remaining ones of said plurality of hierarchical indicators and said plurality of identity indicators remain deactivated.

16. The system according to claim 14, further comprising:
each one of said plurality of hierarchical indicators and each one of said plurality of identity indicators being an LED.

17. The system according to claim 13, further comprising:
each one of said plurality of hierarchical indicators and each one of said plurality of identity indicators being an LED;
said CPU executing code for identifying a first LED that is associated with said determined one of said plurality of nodes;
said CPU executing code for identifying a second LED that is associated with said second one of said plurality of devices; and
said CPU executing code for turning said first and second LEDs on.

18. The system according to claim 13, further comprising:
said CPU executing code for deactivating said second one of said plurality of hierarchical indicators and said second one of said plurality of identity indicators to identify said second one of said plurality of devices further including turning said first and second LEDs off.

19. A computer program product comprising:
a computer-readable storage medium including computer usable program code for hierarchically encoding indicators that are used to identify one of a plurality of devices, said computer program product including:
instruction means for providing a plurality of nodes, each one of said plurality of nodes including an identical set of a plurality of devices;
instruction means for associating each one of a plurality of hierarchical indicators with a different one of said plurality of nodes;
instruction means for associating each one of a plurality of identity indicators with a different one of said plurality of devices; and
instruction means for identifying one of said plurality of devices in one of said plurality of nodes using a combination of one of said plurality of hierarchical indicators and one of said plurality of identity indicators.

20. The product according to claim 19, further comprising:
instruction means for utilizing said one of said plurality of hierarchical indicators and said one of said plurality of identity indicators for identifying a physical location of said one of said plurality of devices.

21. The product according to claim 19, further comprising:
said plurality of devices being a plurality of field replaceable units (FRUs).

22. The product according to claim 19, further comprising:
instruction means for determining that a second one of said plurality of devices needs to be identified;
instruction means for determining one of said plurality of nodes within which said second one of said plurality of devices is located;
instruction means for identifying a second one of said plurality of hierarchical indicators that is associated with said determined one of said plurality of nodes;
instruction means for identifying a second one of said plurality of identity indicators that is associated with said second one of said plurality of devices; and
instruction means for utilizing said second one of said plurality of hierarchical indicators and said second one of said plurality of identity indicators to identify said second one of said plurality of devices.

23. The product according to claim 22, further comprising:
said instruction means for utilizing said second one of said plurality of hierarchical indicators and said second one of said plurality of identity indicators to identify said second one of said plurality of devices further including instruction means for activating said second one of said plurality of hierarchical indicators and said second one of said plurality of identity indicators.

24. The product according to claim 23, further comprising:
instruction means for activating said second one of said plurality of hierarchical indicators and said second one of said plurality of identity indicators while all remaining ones of said plurality of hierarchical indicators and said plurality of identity indicators remain deactivated.

25. The product according to claim 23, further comprising:
each one of said plurality of hierarchical indicators and each one of said plurality of identity indicators being an LED.

26. The product according to claim 22, further comprising:
each one of said plurality of hierarchical indicators and each one of said plurality of identity indicators being an LED;
instruction means for identifying a first LED that is associated with said determined one of said plurality of nodes;
instruction means for identifying a second LED that is associated with said second one of said plurality of devices; and
said instruction means for utilizing said second one of said plurality of hierarchical indicators and said second one of said plurality of identity indicators to identify said instance second one of said plurality of devices further including instruction means for turning said first and second LEDs on.

27. The product according to claim 22, further comprising:
instruction means for deactivating said second one of said plurality of hierarchical indicators and said second one of said plurality of identity indicators to identify said second one of said plurality of devices further including turning said first and second LEDs off.

* * * * *